July 21, 1931.    M. LOUGHEAD    1,815,157
FLUID OPERATED BRAKE
Filed Feb. 21, 1924
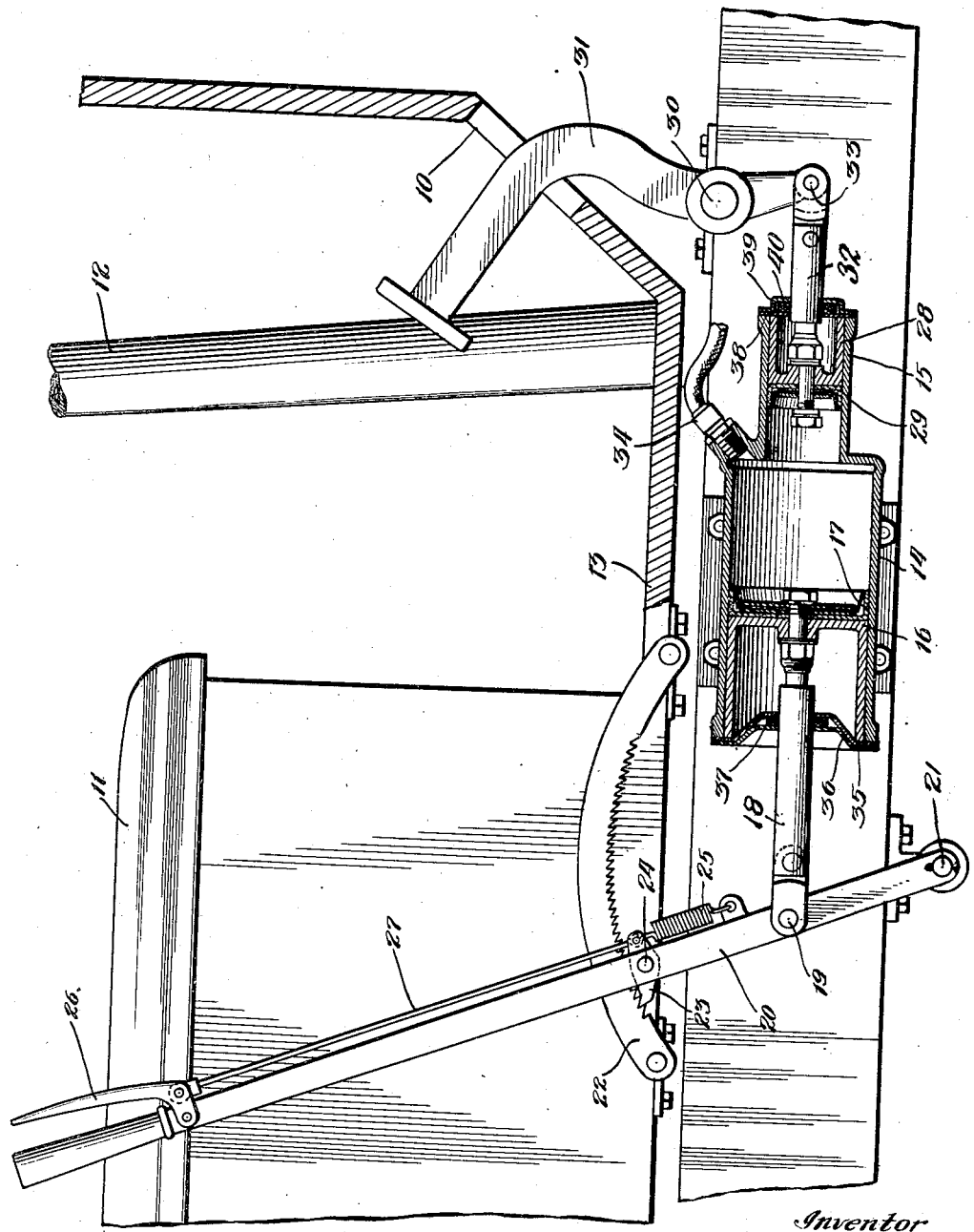
Inventor
Malcolm Loughead Patented July 21, 1931

1,815,157

UNITED STATES PATENT OFFICE

MALCOLM LOUGHEAD, OF DETROIT, MICHIGAN, ASSIGNOR TO HYDRAULIC BRAKE COMPANY, OF LOS ANGELES, CALIFORNIA, A CORPORATION OF CALIFORNIA

FLUID OPERATED BRAKE

Application filed February 21, 1924. Serial No. 694,260.

This invention relates to vehicle brakes of the fluid operated type, and particularly to means whereby a large quantity of fluid may be forced into the brake operating cylinders to take up the slack in the brakes, and whereby the fluid in the system may subsequently be placed under high pressure to force the brake bands into operative engagement with the brake drums.

In order satisfactorily to set the brakes employed on heavy vehicles, such as passenger busses, trucks, etc., without the use of excessively high pressures, it is desirable that brake operating cylinders be employed which are larger than those ordinarily used in connection with pleasure vehicles. It is also desirable that the pistons have sufficient movement to permit them to tighten their brake bands even after the bands have become considerably worn, and therefore loose about the drums. This greatly reduces the frequency of adjustment required. On account of the relatively large size of the brake operating cylinders, and the latitude of movement of the pistons employed in this type of vehicle, it is necessary that the main compressor cylinder be capable of forcing out and placing under high pressure a comparatively large amount of fluid. In certain cases, it has been found difficult to eject and place under sufficient pressure the quantity of fluid required to operate the brakes. In such cases, it is desirable to provide an easily operated means for first ejecting a large quantity of fluid into the system under low pressure to take up the slack in the brakes and subsequently employ pressure producing means operated by the foot pedal to place the fluid under high pressure.

The object of the invention is to provide a device of this character which is particularly applicable to motor operated passenger coaches, trucks, and other vehicles of like character.

The principal feature of the invention is the provision of a piston of relatively large area which is operated by a lever, which may be the emergency brake lever of the vehicle, to force a large quantity of fluid into the system to take up the slack in the brakes, and another piston of relatively small area which is operated by the usual foot pedal to place the fluid in the system under high pressure in order to bring the brake bands firmly into engagement with the brake drums.

It is believed the invention will be understood most readily from a detailed description thereof taken in connection with the acompanying drawing, which is a side view schematically indicating a portion of the vehicle with the main fluid compressor associated therewith.

Referring now to the drawing, 10 indicates the usual foot boards of the vehicle, 11 the operator's seat, 12 a portion of the steering post, and 13 the floor boards under the operator's feet. Positioned below the floor boards 13 and rigidly joined to the motor frame, in any desired manner, is the cylinder structure comprising the large cylinder 14 and the smaller cylinder 15 which communicate with each other at their adjacent ends. Slidably mounted within the cylinder 14 is the piston 16 carrying the cup leather 17. The piston rod 18 is secured to the piston 16 and cup leather 17 at one end, the other end of the rod 18 being pivotally joined at 19 to the lever 20 supported on the fixed pivot 21.

Adjacent to the lever 20 is the arcuate ratchet 22 which is engaged by the pawl 23 pivotally supported on lever 20 by the pin 24. A spring 25 is provided normally to maintain the end of pawl 23 in engagement with the rack 22. The pawl 23 is arranged to be withdrawn from its operative relation to the rack 22 by means of the usuaul lever 26 and link 27.

Slidably positioned within the cylinder 15 is a piston 28 provided with the cup leather 29. Pivotally supported on the fixed rod or pivot 30 is the usual foot operated brake lever 31. The piston rod 32 has one end firmly secured to the piston 28 and its other end pivotally secured to the lower end of lever 31 by means of the pin 33. At 34 is indicated the connection to which is joined the pipe which leads to the brake operating cylinders associated with the several wheels respectively.

In order to prevent dust and grit from obtaining access to the cylinder 14, there is secured to the end of the cylinder a pair of thin metallic plates 35 and 36, between which is held the washer 37 of felt or other suitable material. The plates 35 and 36 and the washer 37 are perforated to permit the passage therethrough of the piston rod 18. The cylinder 15 is provided with a similar arrangement which consists of the metallic plates 38, 39, and the felt washer 40.

It has been found in practice that the operators of motor busses, trucks, and similar vehicles very commonly partially set the emergency brakes when approaching a boulevard or other point where they must stop, and then apply the foot brakes to finally stop the movement of the vehicle.

The present invention contemplates in one of its forms operating the piston 16 by the actuation of the emergency brake lever. In certain motor driven passenger busses, the emergency brake lever is so arranged as to be pushed forwardly in order to set the brakes, and the present invention is disclosed in connection with an arrangement of this type. It is to be understood, however, that the piston 16 may readily be operated through the actuation of an emergency brake lever which is pulled back to set the brakes.

While the piston associated with the large compressor cylinder may conveniently be associated with the emergency brake equipment, if desired, a special operating lever or foot pedal may be employed to actuate the large piston.

In the operation of the system employing the mechanism herein disclosed, the operator, upon approaching a position where it is desired to stop, will move the lever 20 forwardly so as to force a large amount of fluid into the brake operating cylinders and thus take up the slack in the brake bands and bring them lightly into engagement with the brake drums. When it is desired to bring the vehicle to a stop, the operator will press on the foot lever 31 which will place the fluid in the system under high pressure, causing the brake bands firmly to engage the brake drums. On bringing the vehicle to a stop, the foot lever will be released and the hand lever will be returned to its normal position. If desired the piston rods 18 and 32 may be designed to form a lost motion arrangement in each of the piston rods so the pistons need not follow the levers when they return to normal, but will be forced back by the pressure of the fluid in the system, thus avoiding any possibility of air entering the system past the pistons as may sometimes happen when the pistons are forcibly returned to normal.

It is to be understood that while in the drawing and above description but one embodiment of the invention applied to a particular type of vehicle is disclosed, many modifications are contemplated, and the invention should, therefore, be limited merely by the scope of the appended claims.

Having thus described my invention, what I claim as new and desire to secure by Letters Patent of the United States is:

1. In a liquid operated brake system, the combination with a vehicle, of a compressor cylinder carried by said vehicle and having a rearwardly directed open end, a second cylinder of relatively small cross sectional area communicating with said first cylinder and having a forwardly directed open end, a piston within said first mentioned cylinder, a forwardly movable lever for forcing said piston into said cylinder, a piston within said second cylinder, and a foot-actuated lever for forcing said second mentioned piston into said cylinder.

2. In a liquid operated brake system, compressor mechanism comprising a cylinder, a piston in said cylinder, an emergency brake lever, means joining said piston to said lever, a second cylinder of relatively small cross sectional area communicating with said first cylinder, a piston in said second cylinder, and a foot operated lever for actuating said second mentioned piston.

3. In a liquid operated brake system, compressor mechanism comprising a cylinder, a piston in said cylinder, an emergency brake lever adapted to be moved forwardly to apply the brakes, means joining said lever to said piston whereby the forward movement of said lever forces said piston into said cylinder, a second cylinder of relatively small cross sectional area communicating with said first cylinder, a piston in said second cylinder, and a foot operated lever for actuating said second mentioned piston.

4. In combination with a liquid-operated brake system, a plurality of interconnected compressors of high and low pressures respectively for placing the liquid of the system under pressure, and a plurality of manually and independently operable levers for actuating the respective compressors arranged for quick and successive or concurrent operation by the driver.

5. The combination with a liquid conducting connection to the brake actuating liquid motors of a braking system, of a compressor for supplying liquid under pressure thereto, comprising a plurality of interconnected cylinders having pistons of large and small areas respectively and a plurality of independently operable levers for actuating the respective pistons whereby the piston of large area may be employed for a major low-pressure displacement of the liquid to set the brakes, and the small area piston may be actuated to produce a minor high-pressure displacement to apply the brakes.

6. In combination with a liquid operated system for applying a vehicle brake, including a cylinder having a plurality of bores, pistons in the respective bores of said cylinder, a lever for causing selective pressure in the liquid system by actuation of one of the pistons, means for holding said piston against retrograde movement in the cylinder, and a second and independent quickly controllable lever for causing movement of a second piston to create pressure in the liquid system.

In witness whereof, I hereunto subscribe my name this 1st day of February, 1924.

MALCOLM LOUGHEAD.